(12) United States Patent
Poremba et al.

(10) Patent No.: US 12,153,922 B2
(45) Date of Patent: Nov. 26, 2024

(54) PIM SEARCH STOP CONTROL

(71) Applicant: Advanced Micro Devices, Inc., Santa Clara, CA (US)

(72) Inventors: Matthew R Poremba, Seattle, WA (US); Ersin Cukurtas, Charlottesville, VA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 162 days.

(21) Appl. No.: 18/147,075

(22) Filed: Dec. 28, 2022

(65) Prior Publication Data

US 2024/0220251 A1 Jul. 4, 2024

(51) Int. Cl.
*G06F 9/30* (2018.01)
*G06F 7/02* (2006.01)

(52) U.S. Cl.
CPC .............. *G06F 9/3004* (2013.01); *G06F 7/02* (2013.01); *G06F 9/3009* (2013.01)

(58) Field of Classification Search
None
See application file for complete search history.

(56) References Cited

U.S. PATENT DOCUMENTS

| | | | |
|---|---|---|---|
| 2023/0205705 A1* | 6/2023 | Poremba | G06F 15/7821 711/203 |
| 2023/0368841 A1* | 11/2023 | Lue | G11C 15/046 |
| 2024/0201993 A1* | 6/2024 | Aga | G06F 9/345 |

* cited by examiner

*Primary Examiner* — Michael Sun
(74) *Attorney, Agent, or Firm* — FIG. 1 Patents

(57) ABSTRACT

In accordance with described techniques for processing-in-memory (PIM) search stop control, a computing system or computing device includes a memory system that includes a stop condition check component, which receives an instruction that includes a programmed check value. The stop condition check component compares the programmed check value to outputs of a PIM component, and the stop condition check component initiates a stop instruction to stop the PIM component from processing subsequent computations based on an output of the PIM component matching the programmed check value.

20 Claims, 6 Drawing Sheets

```
// Algorithm 1: Return true if needle is found in haystack
bool find_key(int needle, int *haystack) {
    int channel = getThreadId(); // Thread id from gpu/cpu/etc. api for (auto column = 0 … numColumns) {
        // (1) Compute "all-bank" address in next column.
        addr_t next_address = getNextAddr(channel, column);
        // (2) Read next column. DRAM row activates if not already.
        PIM_read(PIMReg0, next_address);
        // (3) Compare 32-bit lanes in PIM with 32-bit needle.
        // Set lane value to '1' if the values match.
        PIM_compare(PIMReg0, needle);
        // (4) Check if needle was found. Currently this requires
        // iterating over all banks in the channel.

for (auto bank = 0 … numBanks) {
            if (PIM_read_reg(PIMReg0) != 0) {
                return true;
            }
        }
    } return false;
}
```

```
// Algorithm 2: Return true if needle is found in haystack
bool find_key(int needle, int *haystack) {
    int channel = getThreadId(); // Thread id from gpu/cpu/etc. api // API: f(/* register */, /* max iterations */, /* stop condition */)
    // Setup PIM iteration stop if PIMReg0 is non-zero. Iterate over up
    // to numColumns columns before ignoring further PIM commands.
    pim::setup_iteration_stop(PIMReg0, numColumns, STOP_NON_ZERO);

for (auto column = 0 … numColumns) {
        // (1) Compute "all-bank" address in next column.
        addr_t next_address = getNextAddr(channel, column);
        // (2) Read next column. DRAM row will activate if not already.
        PIM_read(PIMReg0, next_address);
        // (3) Compare 32-bit lanes in PIM with 32-bit needle. Set
        // lane value to '1' if the values match. The stop condition
        // checker will ignore further PIM commands until reset
        PIM_compare(PIMReg0, needle);
    }

// Stop ignoring PIM commands
    pim::reset_iteration_stop();
}
```

FIG. 3

PIM SEARCH STOP CONTROL

BACKGROUND

The processing and transfer of data in the memory of computing systems and devices utilizes various conventional techniques to facilitate task migration and offload some near-memory processing tasks for instruction threads, such as processing instructions in device memory and returning the requested results. Typically, consideration of whether to offload a processing task accounts for the overhead associated with data transfer latencies, such as when utilizing caches, processing-in-memory (PIM) devices, and/or other near-memory processing techniques in memory systems.

BRIEF DESCRIPTION OF THE DRAWINGS

The detailed description is described with reference to the accompanying figures.

FIG. 2 depicts non-limiting example of an algorithm in pseudocode as a typical PIM application, such as related to PIM search stop control, as described herein.

FIG. 3 depicts a non-limiting example of an algorithm in pseudocode as a PIM application, such as related to PIM search stop control, as described herein.

DETAILED DESCRIPTION

Figure 1:
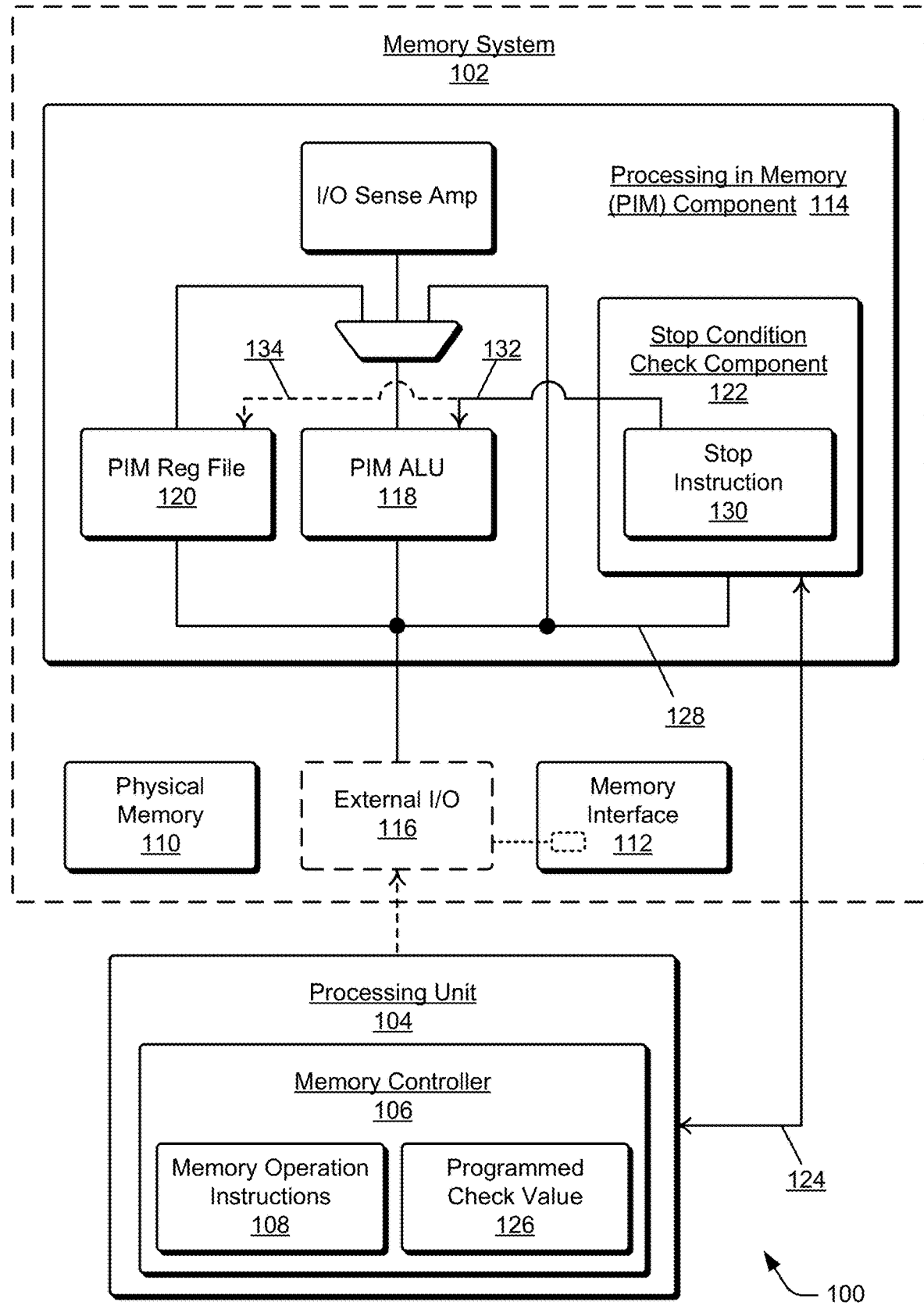
FIG. 1 is a block diagram of a non-limiting example system for PIM search stop control, as described herein.

In aspects of the techniques described herein for PIM search stop control, a stop condition check component implemented in a PIM component is a programming interface and hardware apparatus that enables PIM applications to iterate over a subset of memory columns to provide improved performance and reduced energy overhead for PIM applications. Typically, PIM applications are written to iterate over multiple memory columns of a memory row, since the size of a register in PIM is smaller than the size of a dynamic random access memory (DRAM) row. PIM applications iterate over multiple memory columns of a memory row, such as responsive to a memory computation instruction from a host processing unit. However, for some PIM applications, the computation may be completed before iterating across all of the memory columns of a memory row.

Accordingly, the described aspects of a PIM search stop control, such as to stop memory search iterations, is hardware logic implemented in PIM, which provides a programming interface and allows an application developer to specify a number of memory columns over which to iterate, as well as a stop condition. A stop condition can be specified as an instruction from the host processing unit, which indicates a programmed check value for comparison to outputs of the PIM. In implementations, the stop condition check component is hardware logic usable to stop memory search iteration, and provides a memory controller scheduler with information about the access pattern over a DRAM row. Notably, aspects of the described PIM search stop control can be utilized and leveraged by any type of CPU, APU, GPU, and/or FPGA hardware, enabling a wide class of applications use of PIM, and use by any computing devices that are implemented as a host controlling a PIM-enabled memory.

Various aspects of the described PIM search stop control provides a solution for applications that do not necessarily need to iterate over all memory columns in a row. For example, an application searching for a key/data pair in a hash table, B/B+ trees, etc. in PIM relies on iterating over arrays of keys through iterating over the columns in banks of memory. As soon as the condition for finding the right key is satisfied, there is no need to continue iterating over the rest of the columns, which only results in unneeded computation and wasted energy on memory operation instructions (e.g., activate, read, write, or precharge DRAM commands). Aspects of the described PIM search stop control accounts for and provides a solution for unneeded computation and wasted energy in these applications. Further, the described features allow for improved scheduling of memory requests by knowing the column iteration pattern and limits the number of useless memory requests that occur if an application's computation has been completed before all columns are iterated across. The described features are effective to reduce device power consumption and improves performance, particularly as related to search iteration efficiency and faster data movement through a device memory interface or through a distributed systems interconnect.

In aspects of the described techniques, a computing system or computing device includes a memory system that receives memory operation instructions issued by a processing unit (e.g., a host processor). The processing unit processes and initiates the memory operation instructions for any type of software, application, procedure, device function, device component, and/or system module that initiates operation instructions, such as for read, modify, and write (RMW) memory operations. The memory system includes a memory interface (also referred to herein as a hardware-software (HW/SW) interface), which is the interface to a physical memory of the memory system, as well as to a processing-in-memory (PIM) component of the memory system.

In some aspects, the techniques described herein relate to a computing device comprising a memory system to receive memory operation instructions, and a stop condition check component to receive an instruction that includes a programmed check value, compare the programmed check value to outputs of a processing-in-memory component, and initiate a stop instruction to stop the processing-in-memory component from processing subsequent computations based on an output of the processing-in-memory component matching the programmed check value.

In some aspects, the techniques described herein relate to a computing device where the stop condition check component is configured to receive the instruction from a processing unit via a side channel connection.

In some aspects, the techniques described herein relate to a computing device where the stop condition check component is configured to receive the instruction that includes multiple programmed check values, and compare the multiple programmed check values to the outputs of the processing-in-memory component.

In some aspects, the techniques described herein relate to a computing device where the outputs of the processing-in-memory component are calculation outputs of an arithmetic logic unit of the processing-in-memory component, and the stop condition check component is configured to determine that the programmed check value matches a calculation output of the arithmetic logic unit.

In some aspects, the techniques described herein relate to a computing device where the outputs of the processing-in-memory component are masked outputs of an arithmetic logic unit of the processing-in-memory component, and the stop condition check component is configured to determine that the programmed check value matches a masked output of the arithmetic logic unit.

In some aspects, the techniques described herein relate to a computing device where the stop condition check component is configured to communicate the stop instruction to at least one of an arithmetic logic unit of the processing-in-memory component or a register file of the processing-in-memory component.

In some aspects, the techniques described herein relate to a computing device where the stop condition check component is configured to receive a subsequent instruction that includes a new programmed check value for iterations over memory columns of at least one of a next row of the memory columns or a group of rows of the memory columns.

In some aspects, the techniques described herein relate to a computing device where the stop condition check component is configured to receive a resume instruction to resume the processing-in-memory component processing the subsequent computations.

In some aspects, the techniques described herein relate to a memory system comprising a processing-in-memory component configured to receive a memory search instruction, and a stop condition check component configured to stop the processing-in-memory component from processing subsequent computations based on a programmed check value compared to outputs of the processing-in-memory component.

In some aspects, the techniques described herein relate to a memory system where the stop condition check component is configured to communicate a stop instruction to the processing-in-memory component based on an output of the processing-in-memory component matching the programmed check value.

In some aspects, the techniques described herein relate to a memory system where the stop condition check component is configured to communicate a stop instruction to the processing-in-memory component after iterating over a designated number of memory columns in a row of the memory columns.

In some aspects, the techniques described herein relate to a memory system where the stop condition check component is configured to receive an instruction that includes the programmed check value from a processing unit, and receive a resume instruction to resume the processing-in-memory component processing the subsequent computations.

In some aspects, the techniques described herein relate to a method of receiving an instruction that includes a programmed check value, comparing the programmed check value to outputs of a processing-in-memory component, and initiating a stop instruction to stop the processing-in-memory component from processing subsequent computations based on an output of the processing-in-memory component matching the programmed check value.

In some aspects, the techniques described herein relate to a method where the instruction is received from a processing unit via a side channel connection.

In some aspects, the techniques described herein relate to a method where the instruction includes multiple programmed check values, and the method further comprising comparing the multiple programmed check values to the outputs of the processing-in-memory component.

In some aspects, the techniques described herein relate to a method where the outputs of the processing-in-memory component are calculation outputs of an arithmetic logic unit of the processing-in-memory component, and the method further comprising determining that the programmed check value matches a calculation output of the arithmetic logic unit.

In some aspects, the techniques described herein relate to a method where the outputs of the processing-in-memory component are masked outputs of an arithmetic logic unit of the processing-in-memory component, and the method further comprising determining that the programmed check value matches a masked output of the arithmetic logic unit.

In some aspects, the techniques described herein relate to a method including communicating the stop instruction to at least one of an arithmetic logic unit of the processing-in-memory component or a register file of the processing-in-memory component.

In some aspects, the techniques described herein relate to a method including receiving a subsequent instruction that includes a new programmed check value for iterations over memory columns of at least one of a next row of the memory columns or a group of rows of the memory columns.

In some aspects, the techniques described herein relate to a method including receiving a resume instruction to resume the processing-in-memory component processing the subsequent computations.

FIG. 1 is a block diagram of a non-limiting example system 100 for PIM search stop control, as described herein. The example system 100 is illustrative of any type of a computing system or computing device that includes a memory system 102 and a processing unit 104 (e.g., a host processor), which includes a memory controller 106 that initiates memory operation instructions 108 to the memory system. The processing unit processes and initiates the memory operation instructions 108 for any type of software, application, procedure, device function, device component, and/or system module that initiates operation instructions, such as read, modify, and write memory operations.

In implementations, the memory system 102 includes a physical memory 110 and a memory interface 112 (e.g., a hardware-software (HW/SW) interface), which is the interface to the physical memory of the memory system. The example system 100 is implementable in any number of different types of computing systems and/or computing devices, with various components, such as a device with the processing unit 104 and the memory system 102. The physical memory 110 is any of a variety of volatile memory, such as dynamic random access memory (DRAM), or any of a variety of nonvolatile memory, such as resistive random access memory (e.g., memristors). The memory interface 112 manages the memory operation instructions 108, such as modifying data, reading data from, and writing data to the physical memory 110.

In implementations of this example system 100, the memory system 102 includes a processing-in-memory (PIM) component 114, which includes one or more in-memory processors and is configured to process the PIM instructions (e.g., the memory operation instructions 108 received from the memory controller 106 of the processing unit 104 via external input/output (I/O) 116). For example, the one or more in-memory processors of the PIM component 114 processes instructions using data stored in the physical memory 110. A PIM component using in-memory processors contrasts with standard computer architectures which obtain data from memory, communicate the data to a remote processing unit (e.g., the processing unit 104, a host processor), which is remote from the memory system 102, and process the data using the remote processing unit (e.g., rather than processing by the PIM component 114).

In this example memory system 102, the PIM component 114 includes a PIM arithmetic logic unit (ALU) 118, a PIM register file 120, and a stop condition check component 122. In implementations, the stop condition check component 122 is additional hardware logic added to the PIM, where the hardware logic resides in DRAM memory banks on a DRAM logic process. Further, the stop condition check component 122 is implemented for (but is not limited to) comparison checks, such as all zero, non-zero, compare with a programmed value, etc. Although not shown, a complementary component to the stop condition check component 122 is a unit implemented in the memory controller 106, which both tracks the current and maximum number of PIM iterations, as well as communicates with the stop condition check component. Overall, this is additional information provided to the memory controller scheduler and does not necessarily need a special hardware unit of its own.

Although illustrated as a component or module of the PIM component 114, the stop condition check component 122 is implementable as an independent component, separate from the PIM component in the memory system 102. In one or more implementations, the stop condition check component 122 is a programmable state machine. Alternatively, or in addition, the stop condition check component 122 includes independent processing, memory, and/or logic components functioning as a computing and/or electronic device integrated with the PIM component 114 and/or the memory system 102. The stop condition check component 122 is implementable in software, in hardware, or as a combination of software and hardware components. Further, the stop condition check component 122 is implementable in firmware and/or at least partially in computer hardware. For example, at least part of the component is executable by a processor (e.g., in-memory processor of the PIM component), and/or at least part of the module is implemented in logic circuitry.

In aspects of the techniques for PIM search stop control, the stop condition check component 122 of the PIM component 114 is a programming interface and hardware apparatus that enables PIM applications to iterate over a subset of memory columns to provide improved performance and reduced energy overhead for the PIM applications. Typically, PIM applications are written to iterate over multiple memory columns, since the size of a register in PIM is smaller than the size of a dynamic random access memory (DRAM) row. For some PIM applications, the computation may be done before iterating across all memory columns of a row.

Accordingly, the described aspects of PIM search stop control provides a programming interface that allows an application developer to specify a number of memory columns over which to iterate, and a stop condition. In implementations, the stop condition check component 122 is hardware logic usable to stop memory search iteration, and that provides a memory controller scheduler with information about the access pattern over a DRAM row. Notably, aspects of the described PIM search stop control can be utilized and leveraged by any type of CPU, APU, GPU, and/or FPGA hardware, enabling a wide class of applications use of PIM, and use by any computing devices that are implemented as a host controlling a PIM-enabled memory.

Various aspects of the described PIM search stop control provides a solution for applications that do not necessarily need to iterate over all memory columns in a row. For example, an application searching for a key/data pair in a hash table, B/B+ trees, etc. in PIM relies on iterating over arrays of keys through iterating over the columns in banks of memory. As soon as the condition for finding the right key is satisfied, there is no need to continue iterating over the rest of the columns. Continuing to iterate over the remaining columns after the key is found (e.g., in this example) only leads to unneeded computation and wasted energy on activate, read, write, or precharge DRAM commands. Aspects of the described PIM search stop control accounts for and provides a solution for unneeded computation and wasted energy in these applications. Further, the described features allow for improved scheduling of memory requests by knowing the column iteration pattern and limits the number of useless memory requests that occur if an application's computation has been completed before all columns are iterated across. The described features are effective to reduce device power consumption and improves performance, particularly as related to search iteration efficiency.

In aspects of the techniques for PIM search stop control, the stop condition check component 122 of the PIM component 114 receives an instruction from the processing unit 104 via a side channel connection 124, and the instruction from the processing unit includes a programmed check value 126. Alternatively, a shared bus 128 of the PIM component 114 and memory addresses are used for instructions and read/write from/to the stop condition check component 122. The described features provide for ignoring further PIM commands to allow for generic host orchestration, which might issue commands in a burst without waiting for the previous command to complete. In implementations, the stop condition check component 122 of the PIM component 114 receives subsequent instructions that each include a new programmed check value for iterations over memory columns of a next row of the memory columns, or for a group of rows of the memory columns.

The stop condition check component 122 then compares the programmed check value 126 to outputs of the PIM component 114, such as from the PIM ALU 118 and/or the PIM register file 120. In this example implementation of the PIM component 114, the stop condition check component 122 receives the outputs of the PIM component 114 (e.g., from the PIM ALU 118 and/or from the PIM register file 120) via the shared bus 128.

In an implementation, the outputs of the PIM component 114 are calculation outputs of the PIM ALU 118, and the stop condition check component 122 determines whether the programmed check value 126 matches a calculation output of the PIM ALU. Alternatively, or in addition, the outputs of the PIM component 114 are masked outputs of the PIM ALU 118, and the stop condition check component 122 determines whether the programmed check value 126 matches a masked output of the PIM ALU.

In aspects of the techniques for PIM search stop control, the stop condition check component 122 of the PIM component 114 determines that the programmed check value 126 matches or equals an output of the PIM component 114, and initiates a stop instruction 130 (e.g., a stop iterations instruction) to stop the PIM component 114 from processing subsequent computations. In implementations, the stop condition check component 122 communicates the stop instruction 130 to the PIM ALU 118 (at 132) of the PIM component. Alternatively, the stop condition check component 122 communicates the stop instruction 130 to the PIM register file 120 of the PIM component.

In another implementation, the PIM component 114 receives an instruction from the processing unit 104 via the side channel connection 124, and the instruction from the processing unit includes multiple programmed check values (e.g., such as checking for two values A and B, or a zero and a one). The stop condition check component 122 then compares the multiple programmed check values to the outputs of the PIM component (e.g., from the PIM ALU 118 and/or from the PIM register file 120). Similar to the implementations described above, the stop condition check component 122 of the PIM component 114 determines that the multiple programmed check values match or equal outputs of the PIM component 114, and initiates the stop instruction 130 to stop the PIM component 114 from processing subsequent computations. The stop condition check component 122 communicates the stop instruction 130 to the PIM ALU 118 (at 132) of the PIM component. Alternatively, the stop condition check component 122 communicates the stop instruction 130 to the PIM register file 120 of the PIM component.

In aspects of the techniques for PIM search stop control, the stop condition check component 122 of the PIM component 114 communicates the stop instruction 130 to the PIM component 114 based on an output of the PIM ALU 118 and/or the PIM register file 120 matches the programmed check value 126. Alternatively, the stop condition check component 122 communicates the stop instruction 130 to the PIM component 114 after iterating over a designated number of memory columns in a row of the memory columns. After the stop condition check component 122 of the PIM component 114 has initiated the stop instruction 130 to stop the PIM component 114 from processing subsequent computations, the stop condition check component 122 is implemented to receive a resume instruction to resume the PIM component processing the subsequent computations.

FIG. 2 depicts a non-limiting example of an algorithm 200, such as related to aspects of PIM search stop control, as described herein. In this example, the algorithm 200 is shown in pseudocode as a typical PIM application. This style of typical code is due to PIM registers being much smaller than the DRAM row size. For example, in a high bandwidth memory (HBM) product, the PIM register (and subsequent memory word size) is thirty-two (32) bytes while the DRAM row is one (1) kB. To promote as many row buffer hits as possible, the application iterates over the memory columns using some pre-existing application program interface (API) to compute the address of the next memory word (referred to herein as 'column') in the same channel, bank, rank, and DRAM row. Therefore, only a DRAM column command needs to be issued for the next piece of data. The algorithm 200 also assumes commands are all-bank commands and the code is executed with multiple processor threads issuing to each channel.

Aspects of the described PIM search stop control address two notable points in the algorithm 200. First, the nested for-loop 202 (i.e., below comment (4)) in the algorithm is extremely inefficient as it requires reading a relatively large (32 byte) value from every bank in a memory channel in order to determine if the needle was found in the haystack. This not only results in a several additional reads, but the application must stall waiting for the reads to return, essentially adding a memory fence to the application. The result of the comparison could alternately be stored back to memory and the nested loop moved outside of the column loop to avoid waiting for read returns. However, this forces the DRAM row that is being iterated over to be closed so as to open the row needed for storage, which is also inefficient.

Aspects of the described PIM search stop control provides the stop condition check component 122 as a hardware stopping mechanism, which solves this inefficiency by moving the check into the PIM logic so that the data is not read back to the host (e.g., processing unit 104). The described features of the disclosure enables several classes of applications to perform better with PIM than the classic alternative, with these applications typically performing worse due to this condition check.

A second notable point in the algorithm 200 is that there is only one PIM_read call, which means that only one array of memory data is being read from PIM. The described features take advantage of this by specifying a maximum number of column iterations to the memory controller 106 that can be performed by the application. The memory controller 106 uses this information to keep the DRAM row open until all column iterations have been completed, or at least mark column commands for that DRAM row as higher priority requests to promote row buffer hits in memory.

FIG. 3 depicts a non-limiting example of an algorithm 300, in aspects of PIM search stop control, as described herein. In this example, the algorithm 300 is shown in pseudocode as an improved implementation of the algorithm 200 shown and described with reference to FIG. 2. This example algorithm 300 leverages the stop condition check component 122 of the PIM component 114 as shown and described with reference to FIG. 1, and the algorithm 300 improves processing performance while also reducing the energy consumption.

Figure 4:
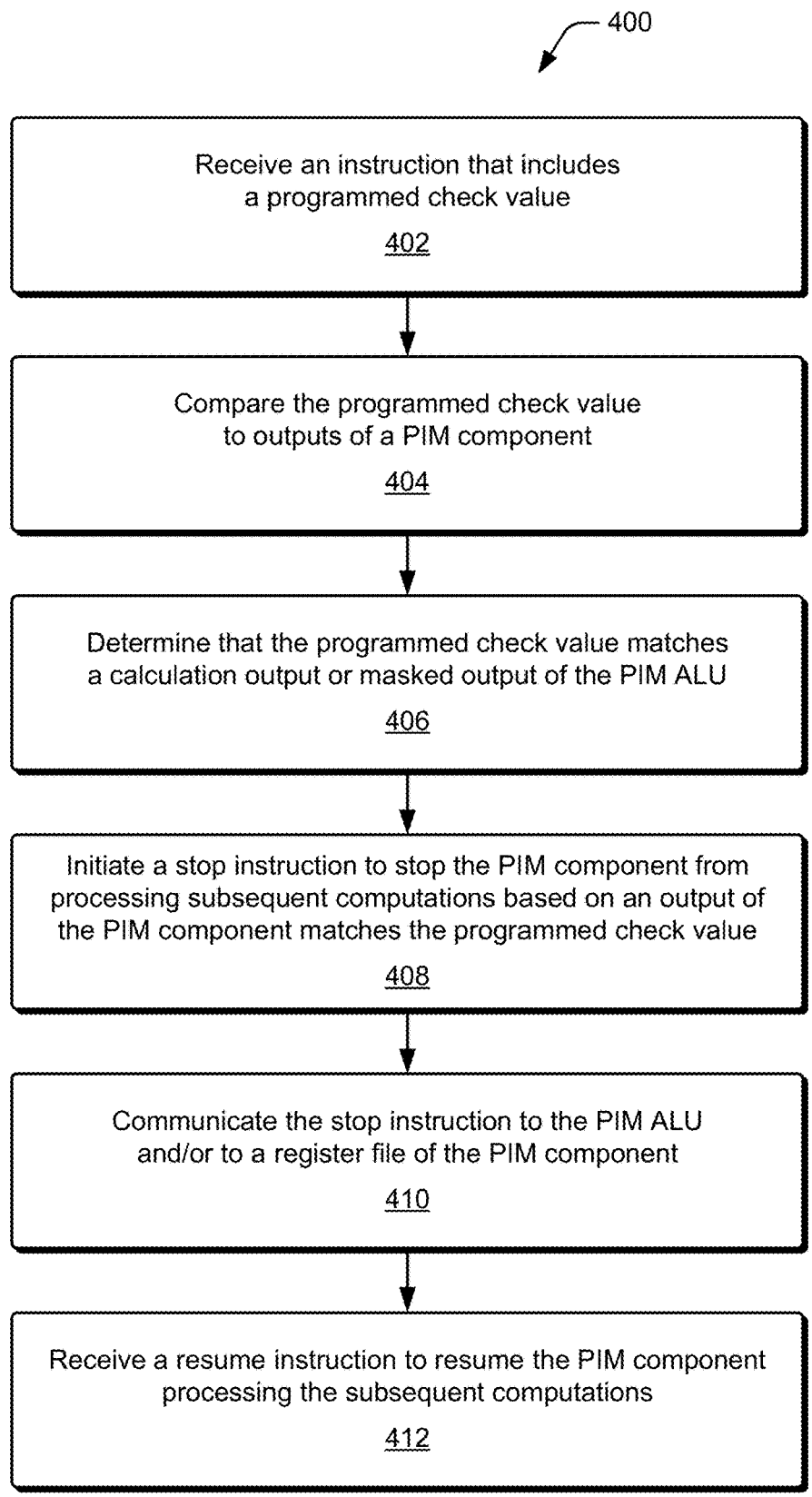
FIGS. 4-6 depict procedures in example implementations for PIM search stop control, as described herein.

FIG. 4 is a flow diagram depicting a procedure 400 in an example implementation of PIM search stop control, as described herein. The order in which the procedure is described is not intended to be construed as a limitation, and any number or combination of the described operations are performed in any order to perform the procedure, or an alternate procedure.

In the procedure 400, an instruction that includes a programmed check value is received (at 402). For example, the stop condition check component 122 receives an instruction that includes the programmed check value 126 from the processing unit 104 via the side channel connection 124. In alternate implementations, the instruction received by the stop condition check component 122 includes multiple programmed check values, and the stop condition check component compares the multiple programmed check values to outputs of the PIM component 114. Further, the stop condition check component 122 receives a subsequent instruction that includes a new programmed check value for iterations over memory columns of a next row of the memory columns, or for a group of rows of the memory columns.

The programmed check value is compared to outputs of a PIM component (at 404). For example, the stop condition check component 122 compares the programmed check value 126 to the outputs of the PIM component 114, such as calculation outputs of the PIM ALU 118 and/or masked outputs of the PIM ALU of the PIM component.

A determination is made that the programmed check value matches a calculation output or masked output of the PIM ALU (at 406). For example, the stop condition check component 122 determines that the programmed check value 126 matches a calculation output or masked output of the PIM ALU 118. A stop instruction (e.g., a stop iterations instruction) is initiated to stop the PIM component from processing subsequent computations based on an output of the PIM component matching the programmed check value (at 408). For example, the stop condition check component 122 initiates the stop instruction 130 to stop the PIM component 114 from processing subsequent computations based on an output of the PIM component matching the programmed check value 126. The stop instruction is communicated to the PIM ALU and/or to a register file of the PIM component (at 410). For example, the stop condition check component 122 communicates the stop instruction 130 to the PIM ALU 118 (at 132), or as an alternative, to the PIM register file 120 (at 134) of the PIM component.

A resume instruction is received to resume the PIM component processing the subsequent computations (at 412). For example, the stop condition check component 122 receives a resume instruction to resume the PIM component 114 processing the subsequent computations.

Figure 5:
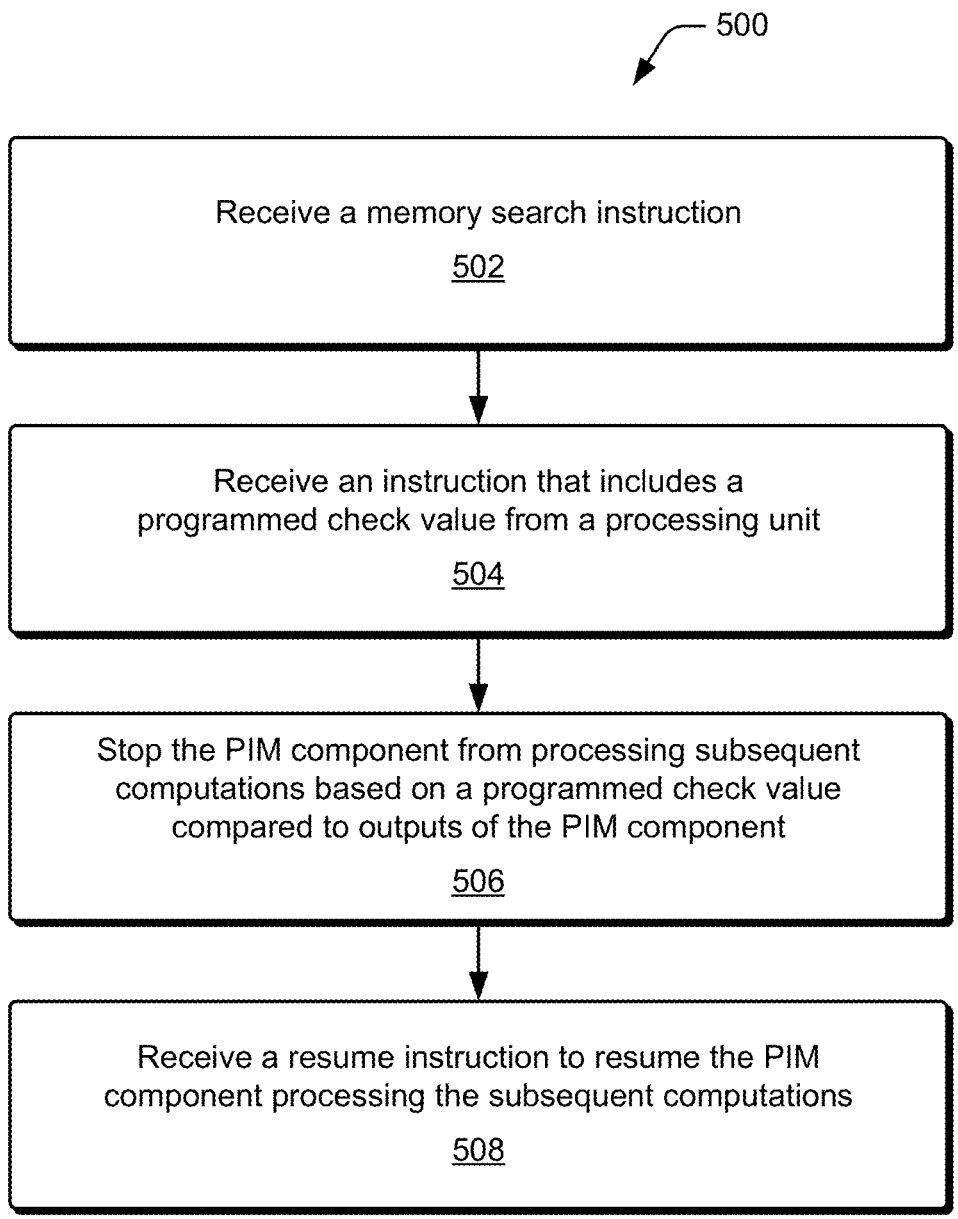

FIG. 5 is a flow diagram depicting a procedure 500 in an example implementation of PIM search stop control, as described herein. The order in which the procedure is described is not intended to be construed as a limitation, and any number or combination of the described operations are performed in any order to perform the procedure, or an alternate procedure.

In the procedure 500, a memory search instruction is received (at 502). For example, the PIM component 114 receives a memory search instruction (e.g., a memory operation instruction 108). An instruction that includes a programmed check value is received from a processing unit (at 504). For example, the stop condition check component 122 receives an instruction that includes the programmed check value 126 via the side channel connection 124.

The PIM component is stopped from processing subsequent computations based on a programmed check value compared to outputs of the PIM component (at 506). For example, the stop condition check component 122 communicates the stop instruction 130 to the PIM component 114 based on an output of the PIM component matching the programmed check value 126. Alternatively, the stop condition check component 122 communicates the stop instruction 130 to the PIM component 114 after iterating over a designated number of memory columns in a row of the memory columns.

A resume instruction is received to resume the PIM component processing the subsequent computations (at 508). For example, the stop condition check component 122 receives a resume instruction to resume the PIM component 114 processing the subsequent computations.

Figure 6:
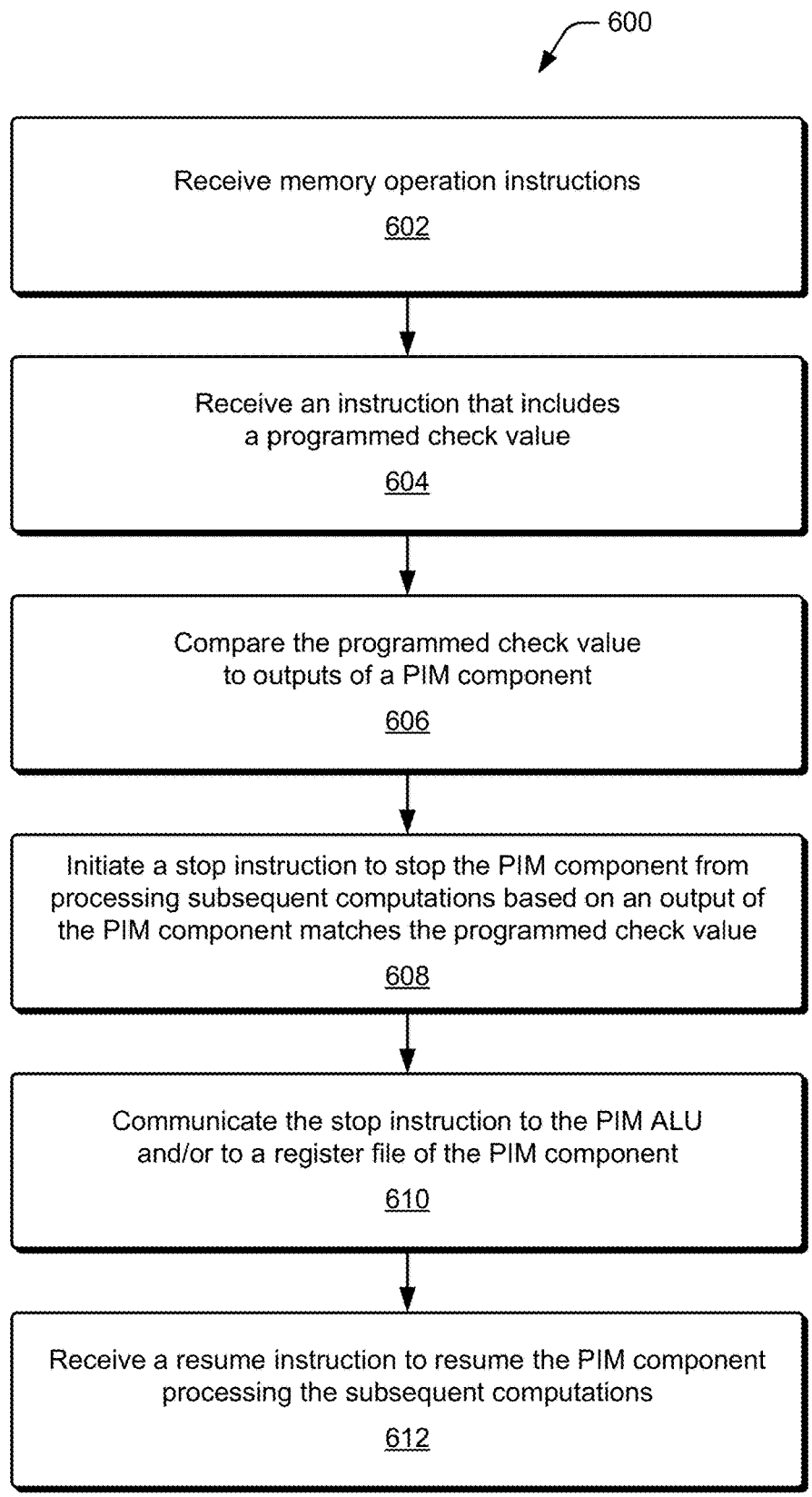

FIG. 6 is a flow diagram depicting a procedure 600 in an example implementation of PIM search stop control, as described herein. The order in which the procedure is described is not intended to be construed as a limitation, and any number or combination of the described operations are performed in any order to perform the procedure, or an alternate procedure.

In the procedure 600, memory operation instructions are received (at 602). For example, the memory system 102 receives the memory operation instructions 108. An instruction that includes a programmed check value is received (at 604). For example, the stop condition check component 122 receives an instruction from the processing unit 104 via the side channel connection 124, and the instruction includes the programmed check value 126. In alternate implementations, the instruction received by the stop condition check component 122 includes multiple programmed check values, and the stop condition check component compares the multiple programmed check values to outputs of the PIM component 114. Further, the stop condition check component 122 receives a subsequent instruction that includes a new programmed check value for iterations over memory columns of a next row of the memory columns, or for a group of rows of the memory columns.

The programmed check value is compared to outputs of a PIM component (at 606). For example, the stop condition check component 122 compares the multiple programmed check values to the outputs of the PIM component 114. In implementations, the outputs of the PIM component 114 are calculation outputs of the PIM ALU 118, and the stop condition check component 122 determines that the programmed check value 126 matches a calculation output of the PIM ALU. Alternatively, or in addition, the outputs of the PIM component 114 are masked outputs of the PIM ALU 118, and the stop condition check component 122 determines that the programmed check value 126 matches a masked output of the PIM ALU.

A stop instruction is initiated to stop the PIM component from processing subsequent computations based on an output of the PIM component matching the programmed check value (at 608). For example, the stop condition check component 122 initiates the stop instruction 130 to stop the PIM component 114 from processing subsequent computations based on an output of the PIM component matching the programmed check value 126. The stop instruction is communicated to the PIM ALU and/or to a register file of the PIM component (at 610). For example, the stop condition check component 122 communicates the stop instruction 130 to the PIM ALU 118 (at 132), or as an alternative, to the PIM register file 120 (at 134) of the PIM component.

A resume instruction is received to resume the PIM component processing the subsequent computations (at 612). For example, the stop condition check component 122 receives a resume instruction to resume the PIM component 114 processing the subsequent computations.

The various functional units illustrated in the figures and/or described herein (including, where appropriate, the memory system 102, the processing unit 104, the PIM component 114, and the stop condition check component 122) are implemented in any of a variety of different forms, such as in hardware circuitry, software, and/or firmware executing on a programmable processor, or any combination thereof. The procedures provided are implementable in any of a variety of devices, such as a general-purpose computer, a processor, a processor core, and/or an in-memory processor. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although implementations of PIM search stop control have been described in language specific to features, elements, and/or procedures, the appended claims are not necessarily limited to the specific features, elements, or procedures described. Rather, the specific features, elements, and/or procedures are disclosed as example implementations of PIM search stop control, and other equivalent features, elements, and procedures are intended to be within the scope of the appended claims. Further, various different examples are described herein and it is to be appreciated that many variations are possible and each described example is implementable independently or in connection with one or more other described examples.

What is claimed is:

1. A computing device, comprising:
 a memory system to receive memory operation instructions; and
 a stop condition check component to:
  receive an instruction that includes a programmed check value;
  compare the programmed check value to outputs of a processing-in-memory component; and
  initiate a stop instruction to stop the processing-in-memory component from processing subsequent computations based on an output of the processing-in-memory component matching the programmed check value.

2. The computing device of claim 1, wherein the stop condition check component is configured to receive the instruction from a processing unit via a side channel connection.

3. The computing device of claim 1, wherein the stop condition check component is configured to:
 receive the instruction that includes multiple programmed check values; and
 compare the multiple programmed check values to the outputs of the processing-in-memory component.

4. The computing device of claim 1, wherein the outputs of the processing-in-memory component are calculation outputs of an arithmetic logic unit of the processing-in-memory component, and the stop condition check component is configured to determine that the programmed check value matches a calculation output of the arithmetic logic unit.

5. The computing device of claim 1, wherein the outputs of the processing-in-memory component are masked outputs of an arithmetic logic unit of the processing-in-memory component, and the stop condition check component is configured to determine that the programmed check value matches a masked output of the arithmetic logic unit.

6. The computing device of claim 1, wherein the stop condition check component is configured to communicate the stop instruction to at least one of an arithmetic logic unit of the processing-in-memory component or a register file of the processing-in-memory component.

7. The computing device of claim 1, wherein the stop condition check component is configured to receive a subsequent instruction that includes a new programmed check value for iterations over memory columns of at least one of a next row of the memory columns or a group of rows of the memory columns.

8. The computing device of claim 1, wherein the stop condition check component is configured to receive a resume instruction to resume the processing-in-memory component processing the subsequent computations.

9. A memory system, comprising:
 a processing-in-memory component configured to receive a memory search instruction; and
 a stop condition check component configured to stop the processing-in-memory component from processing subsequent computations based on a programmed check value compared to outputs of the processing-in-memory component.

10. The memory system of claim 9, wherein the stop condition check component is configured to communicate a stop instruction to the processing-in-memory component based on an output of the processing-in-memory component matching the programmed check value.

11. The memory system of claim 9, wherein the stop condition check component is configured to communicate a stop instruction to the processing-in-memory component after iterating over a designated number of memory columns in a row of the memory columns.

12. The memory system of claim 9, wherein the stop condition check component is configured to:
 receive an instruction that includes the programmed check value from a processing unit; and
 receive a resume instruction to resume the processing-in-memory component processing the subsequent computations.

13. A method, comprising:
 receiving an instruction that includes a programmed check value;
 comparing the programmed check value to outputs of a processing-in-memory component; and
 initiating a stop instruction to stop the processing-in-memory component from processing subsequent computations based on an output of the processing-in-memory component matching the programmed check value.

14. The method of claim 13, wherein the instruction is received from a processing unit via a side channel connection.

15. The method of claim 13, wherein the instruction includes multiple programmed check values, and the method further comprising comparing the multiple programmed check values to the outputs of the processing-in-memory component.

16. The method of claim 13, wherein the outputs of the processing-in-memory component are calculation outputs of an arithmetic logic unit of the processing-in-memory component, and the method further comprising determining that the programmed check value matches a calculation output of the arithmetic logic unit.

17. The method of claim 13, wherein the outputs of the processing-in-memory component are masked outputs of an arithmetic logic unit of the processing-in-memory component, and the method further comprising determining that the programmed check value matches a masked output of the arithmetic logic unit.

18. The method of claim 13, further comprising communicating the stop instruction to at least one of an arithmetic logic unit of the processing-in-memory component or a register file of the processing-in-memory component.

19. The method of claim 13, further comprising receiving a subsequent instruction that includes a new programmed check value for iterations over memory columns of at least one of a next row of the memory columns or a group of rows of the memory columns.

20. The method of claim 13, further comprising receiving a resume instruction to resume the processing-in-memory component processing the subsequent computations.

* * * * *